United States Patent
Qian et al.

(10) Patent No.: US 10,721,691 B2
(45) Date of Patent: Jul. 21, 2020

(54) TERMINAL DEVICE AND POSITIONING INFORMATION PROCESSING METHOD APPLIED TO TERMINAL DEVICE

(71) Applicant: Huawei Technologies Co., Ltd., Shenzhen (CN)

(72) Inventors: Jing Qian, Shanghai (CN); Yuhua Guo, Shanghai (CN); Wanghai Gui, Shanghai (CN); Meiling Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/086,261

(22) PCT Filed: Mar. 18, 2016

(86) PCT No.: PCT/CN2016/076657
§ 371 (c)(1),
(2) Date: Sep. 18, 2018

(87) PCT Pub. No.: WO2017/156754
PCT Pub. Date: Sep. 21, 2017

(65) Prior Publication Data
US 2019/0320390 A1    Oct. 17, 2019

(51) Int. Cl.
*H04W 4/02*   (2018.01)
*H04W 52/02*  (2009.01)
*H04M 1/725*  (2006.01)

(52) U.S. Cl.
CPC ... *H04W 52/0261* (2013.01); *H04M 1/72577* (2013.01); *H04W 4/02* (2013.01)

(58) Field of Classification Search
CPC ... H04W 52/0261; H04W 4/02; H04W 52/02; H04W 52/0251; H04W 52/027;
(Continued)

(56) References Cited

U.S. PATENT DOCUMENTS

2012/0135754 A1   5/2012   Wu et al.
2013/0262716 A1  10/2013   Noro
(Continued)

FOREIGN PATENT DOCUMENTS

CN    102945344 A    2/2013
CN    103428361 A   12/2013
(Continued)

OTHER PUBLICATIONS

Machine Translation and Abstract of Chinese Publication No. CN102945344, Feb. 27, 2013, 15 pages.
(Continued)

*Primary Examiner* — Chuong A Ngo
(74) *Attorney, Agent, or Firm* — Conley Rose, P.C.

(57) ABSTRACT

A terminal device and a positioning information processing method applied to a terminal device, where the terminal device includes a processor and a positioning chip. The processor receives positioning request from a first application program or receives current positioning data of the terminal device from the positioning chip. The first application program is included in the terminal device. The processor obtains using state and running state of the first application program. The processor avoids sending the positioning request to the positioning chip avoids sending the current positioning data to the first application program when the first application program is in a positioning service restricted state the first application program is currently running in the background.

20 Claims, 5 Drawing Sheets

(58) Field of Classification Search
CPC ......... H04W 52/0264; H04W 52/0254; H04M 1/72577; H04M 2250/10; Y02D 70/00; Y02D 70/164
See application file for complete search history.

(56) References Cited

U.S. PATENT DOCUMENTS

| | | | |
|---|---|---|---|
| 2013/0288718 A1* | 10/2013 | MacGougan | H04W 4/021 455/456.4 |
| 2013/0316725 A1 | 11/2013 | MacGougan et al. | |
| 2014/0274225 A1 | 9/2014 | Lacatus et al. | |
| 2015/0304848 A1 | 10/2015 | Kim et al. | |
| 2017/0315240 A1 | 11/2017 | Farmer et al. | |

FOREIGN PATENT DOCUMENTS

| | | |
|---|---|---|
| CN | 103428362 A | 12/2013 |
| CN | 104793995 A | 7/2015 |
| CN | 105094284 A | 11/2015 |
| CN | 105354130 A | 2/2016 |
| JP | 2013206173 A | 10/2013 |
| KR | 20120049280 A | 5/2012 |
| RU | 2478987 C2 | 4/2013 |
| WO | 2013152349 A1 | 10/2013 |

OTHER PUBLICATIONS

Machine Translation and Abstract of Chinese Publication No. CN103428362, Dec. 4, 2013, 19 pages.
Foreign Communication From a Counterpart Application, Russian Application No. 2018136584, Russian Office Action dated May 23, 2019, 13 pages.
Machine Translation and Abstract of Chinese Publication No. CN104793995, Jul. 22, 2015, 15 pages.
Machine Translation and Abstract of Chinese Publication No. CN105094284, Nov. 25, 2015, 26 pages.
Machine Translation and Abstract of Chinese Publication No. CN105354130, Feb. 24, 2016, 9 pages.
Foreign Communication From a Counterpart Application, European Application No. 16893919.7, Partial Supplementary European Search Report dated Nov. 30, 2018, 11 pages.
Foreign Communication From a Counterpart Application, PCT Application No. PCT/CN2016/076657, English Translation of International Search Report dated Dec. 27, 2016, 3 pages.
Foreign Communication From a Counterpart Application, PCT Application No. PCT/CN2016/076657, English Translation of Written Opinion dated Dec. 27, 2016, 6 pages.
Foreign Communication From a Counterpart Application, Japanese Application No. 2018-548858, Japanese Office Action dated Sep. 17, 2019, 6 pages.
Foreign Communication From a Counterpart Application, Japanese Application No. 2018-548858, English Translation of Japanese Office Action dated Sep. 17, 2019, 6 pages.
Machine Translation and Abstract of Chinese Publication No. CN102945344, dated Feb. 27, 2013, 15 pages.
Machine Translation and Abstract of Chinese Publication No. CN103428362, dated Dec. 4, 2013, 19 pages.
Foreign Communication From a Counterpart Application, Chinese Application No. 201680025489.5, Chinese Office Action dated May 27, 2019, 6 pages.
Zdziarski, J., "Chapter 8, Acquisition of Location Information—Core Location," iPhone Sdk Application Development: Building Applications for the Appstore, Ed. 1, O'Reilly Japan, Inc., Sep. 2, 2009, 4 pages.

* cited by examiner

TERMINAL DEVICE AND POSITIONING INFORMATION PROCESSING METHOD APPLIED TO TERMINAL DEVICE

CROSS-REFERENCE TO RELATED APPLICATIONS

This application is a U.S. National Stage of International Patent Application No. PCT/CN2016/076657 filed on Mar. 18, 2016, which is hereby incorporated by reference in its entirety.

TECHNICAL FIELD

Embodiments of the present invention relate to the communications field, and more specifically, to a terminal device and a positioning information processing method applied to a terminal device.

BACKGROUND

As a new-generation mobile intelligent platform becomes popular, positioning by using Global Positioning System (Global Positioning System, GPS) or another type of global navigation satellite system (Global Navigation Satellite System, GNSS) is nearly a standard function of all current intelligent terminals (such as a mobile phone and a tablet computer). The positioning function acts as a basic function of a terminal device, and power consumption of the positioning function is always a popular issue. For example, some applications of the terminal device frequently initiate positioning in a short time, thereby causing excessively high power consumption. Some applications initiate positioning for a long time, thereby causing excessively high power consumption. Some applications (such as the QQ Browser) initiate positioning and obtain, by using a broadcast notification type, positioning data, and consequently, if the applications do not actively cancel positioning, a system cannot stop positioning even if an application process is terminated, thereby causing excessively high power consumption.

Figure 1:
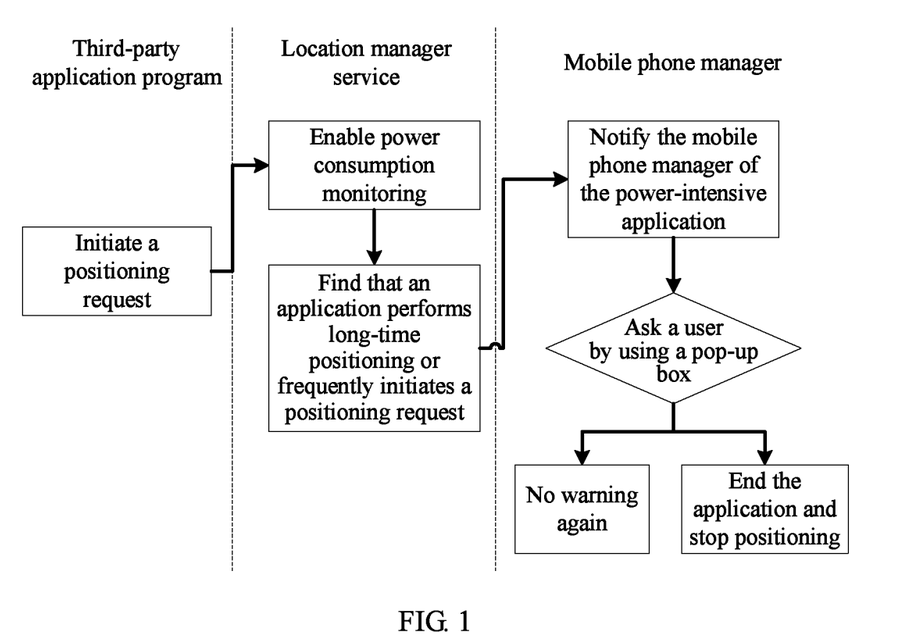
FIG. 1 is a schematic diagram of a technical solution used to control power consumption of a positioning service in the prior art.

To resolve the foregoing problems, a technical solution shown in FIG. 1 is proposed in the prior art. In the technical solution, a terminal discovers, by using an algorithm policy, an abnormal positioning behavior such as long-time positioning or frequent positioning, and notifies a mobile phone manager of a power-intensive application by using a broadcast message. The mobile phone manager warns a user according to the broadcast message, and when a user permission is obtained, terminates the application that has the abnormal positioning behavior, and stops a positioning service. However, in the prior art, if the terminal user performs no processing, whether to provide the positioning service for the application program completely depends on a request of the application program. This cannot implement active control on power consumption caused by the positioning service.

SUMMARY

Embodiments of the present invention provide a terminal device and a positioning information processing method applied to a terminal device, so as to implement active control on power consumption caused by a positioning service in the terminal device.

According to a first aspect, a positioning information processing method applied to a terminal device is provided, where the terminal device includes a processor and a memory that is configured to store a first application program, and the method includes: receiving, by the processor, positioning information; and discarding, by the processor, the positioning information if the first application program is in a positioning service restricted state and the first application program is currently running in the background.

Optionally, the first application program is an application program that requests a positioning service, and may be specifically an application program that is requesting the positioning service and/or an application program that has requested the positioning service. The processor may receive the positioning information, where the positioning information may include a positioning request of the first application program or positioning data requested by the first application program. If the processor determines that the first application program is in the positioning service restricted state and the first application program is currently running in the background, the processor may discard the positioning information, that is, provide no positioning service for the first application program.

Therefore, according to the terminal device in the embodiments of the present invention, when the first application program is in the positioning service restricted state and the first application program is currently running in the background, the processor discards the positioning information corresponding to the first application program, and provides no positioning service for the first application program. This can implement active control on power consumption caused by the positioning service in the terminal device, and avoid an abnormal positioning behavior, such as frequent positioning initiation or long-time positioning, of some application programs that are running in the background of the terminal device, so as to reduce power consumption of the terminal device, increase a standby time of the terminal device, and improve user experience.

Optionally, the terminal device further includes a positioning chip configured to obtain positioning data outside the terminal device.

In a first possible implementation of the first aspect, the receiving, by the processor, positioning information includes: receiving, by the processor, a positioning request sent by the first application program; and the discarding, by the processor, the positioning information includes: prohibiting, by the processor, sending the positioning request to the positioning chip.

In this case, the processor does not send the positioning request to the positioning chip.

In a second possible implementation of the first aspect, the receiving, by the processor, positioning information includes: receiving, by the processor, current positioning data of the terminal device that is sent by the positioning chip; and the discarding, by the processor, the positioning information includes: prohibiting, by the processor, sending the current positioning data of the terminal device to the first application program.

In this case, the processor does not send the positioning data to the first application program.

With reference to the foregoing possible implementations, in a third possible implementation of the first aspect, the method further includes: sending, by the processor, the positioning information if the first application program is not in a positioning service restricted state and/or the first application program is currently running at the foreground.

Optionally, the positioning information includes the positioning request of the first application program, the sending, by the processor, the positioning information includes: sending, by the processor, the positioning request to the positioning chip.

Optionally, if the positioning information includes the positioning data, the sending, by the processor, the positioning information includes: sending, by the processor, the positioning data to the first application program.

With reference to the foregoing possible implementations, in a fourth possible implementation of the first aspect, whether the first application program is in the positioning service restricted state is set by a user, or whether the first application program is in the positioning service restricted state is a default setting of the terminal device.

With reference to the foregoing possible implementations, in a fifth possible implementation of the first aspect, before the discarding, by the processor, the positioning information, the method further includes: determining, by the processor, whether a positioning service frozen list includes the first application program, where the positioning service frozen list includes at least one application program that is in a positioning service restricted state and that is running in the background; and the discarding, by the processor, the positioning information if the first application program is in a positioning service restricted state and the first application program is currently running in the background includes: discarding, by the processor, the positioning information if the positioning service frozen list includes the first application program.

The positioning service frozen list includes at least one application program that is in a positioning service restricted state and that is currently running in the background. Optionally, the processor may determine, by querying the positioning service frozen list, whether the first application program meets a condition of being in the positioning service restricted state and currently running in the background, and further determine accordingly whether to discard the positioning information corresponding to the first application program.

Specifically, if the positioning service frozen list includes the first application program, it indicates that the first application program meets the condition of being in the positioning service restricted state and currently running in the background; otherwise, if the positioning service frozen list does not include the first application program, it indicates that the first application program does not meet the foregoing condition.

In this way, the positioning service frozen list is set, and the processor determines, according to the positioning service frozen list, whether to send the positioning information corresponding to the application program. This can reduce load and complexity of the processor, improve processing efficiency of the positioning service, and improve overall performance of the terminal device.

With reference to the foregoing possible implementations, in a sixth possible implementation of the first aspect, the sending, by the processor, the positioning information if the first application program is not in a positioning service restricted state and/or the first application program is currently running at the foreground includes: sending, by the processor, the positioning information if the positioning service frozen list does not include the first application program.

With reference to the foregoing possible implementations, in a seventh possible implementation of the first aspect, the method further includes: adding, by the processor, a second application program to the positioning service frozen application list if the second application program in the at least one application program changes from foreground running to background running and the second application program is in a positioning service restricted state.

With reference to the foregoing possible implementations, in an eighth possible implementation of the first aspect, the method further includes: deleting, by the processor, the first application program from the positioning service frozen list if the first application program changes from background running to foreground running.

According to a second aspect, another positioning information processing method applied to a terminal device is provided, where the terminal device includes a processor, a display, and a motion sensor, and the method includes: receiving, by the processor, positioning information; determining, by the processor, whether a motion status of the terminal device is a moving state or a still state according to motion data obtained by the motion sensor; and discarding, by the processor, the positioning information if the terminal device currently meets any one of the following conditions: the display is in a screen-off state, the motion status of the terminal device is the still state, or the display is in a screen-off state and the motion status of the terminal device is the still state.

Therefore, according to the terminal device in the embodiments of the present invention, when determining that the display of the terminal device is currently in the screen-off state and/or the terminal device is currently in the still state, the processor discards the received positioning information. This can implement active control on power consumption caused by a positioning service in the terminal device, reduce power consumption of the terminal device, increase a standby time of the terminal device, and improve user experience.

In a first possible implementation of the second aspect, the method further includes: sending, by the processor, the positioning information if the terminal device currently meets at least one of the following conditions: the display is in a screen-on state, or the terminal device is in the moving state.

Optionally, the terminal device may further include a memory configured to store a first application program.

With reference to the foregoing possible implementation, in a second possible implementation of the second aspect, the sending, by the processor, the positioning information if the terminal device currently meets at least one of the following conditions: the display is in a screen-on state, or the motion status of the terminal device is the moving state includes: determining, by the processor according to a current status of the first application program, whether to send the positioning information if the terminal device currently meets the at least one of the following conditions: the display is in the screen-on state, or the motion status of the terminal device is the moving state.

Optionally, the terminal device further includes a positioning chip configured to obtain positioning data outside the terminal device.

With reference to the foregoing possible implementations, in a third possible implementation of the second aspect, the receiving, by the processor, positioning information includes: receiving, by the processor, a positioning request sent by the first application program; and the discarding, by the processor, the positioning information includes: prohibiting, by the processor, sending the positioning request to the positioning chip.

In this case, the processor does not send the positioning request to the positioning chip.

With reference to the foregoing possible implementations, in a fourth possible implementation of the second aspect, the receiving, by the processor, positioning information includes: receiving, by the processor, current positioning data of the terminal device that is sent by the positioning chip; and the discarding, by the processor, the positioning information includes: prohibiting, by the processor, sending the current positioning data of the terminal device to the first application program.

In this case, the processor does not send the positioning data to the first application program.

Optionally, if the positioning information includes the positioning data, the sending, by the processor, the positioning information includes: sending, by the processor, the positioning data to the first application program.

Optionally, if the positioning information includes the positioning request sent by the first application program, the sending, by the processor, the positioning information includes: sending, by the processor, the positioning request to the positioning chip.

With reference to the foregoing possible implementations, in a fifth possible implementation of the second aspect, the discarding the positioning information if the terminal device currently meets any one of the following conditions: the display is in a screen-off state, the motion status of the terminal device is the still state, or the display is in a screen-off state and the motion status of the terminal device is the still state includes: discarding, by the processor, the positioning information if the terminal device currently meets any one of the following conditions: duration in which the display is in the screen-off state reaches a first threshold, duration in which the terminal device is in the still state reaches a second threshold, or duration in which the display is in the screen-off state reaches a third threshold and the terminal device is currently in the still state.

According to some aspects of the present invention, the terminal device may alternatively not include the positioning chip. For example, a positioning function is integrated in the processor.

Optionally, the processor may receive the positioning data by using an RF radio frequency circuit; or the processor receives a positioning signal transmitted by an RF radio frequency circuit, and generates the positioning data according to the positioning signal. If the first application program is in a positioning service restricted state and the first application program is currently running in the background, the processor may determine not to send the positioning data to the first application program.

Optionally, the processor may receive the positioning request sent by the first application program. If the first application program is in the positioning service restricted state and the first application program is currently running in the background, the processor may discard the positioning request message or reject the positioning request of the first application program.

According to a third aspect, a processor configured to execute the method in the first aspect or any possible implementation of the first aspect is provided.

According to a fourth aspect, a processor configured to execute the method in the second aspect or any possible implementation of the second aspect is provided.

According to a fifth aspect, a computer readable medium is provided, configured to store a computer program, where the computer program includes an instruction used to execute the method in the first aspect or any possible implementation of the first aspect.

According to a sixth aspect, a computer readable medium is provided, configured to store a computer program, where the computer program includes an instruction used to execute the method in the second aspect or any possible implementation of the second aspect.

According to a seventh aspect, a terminal device is provided, where the terminal device includes a memory configured to store at least one application program and a processor, and the processor is configured to execute the method in the first aspect or any possible implementation of the first aspect.

According to an eighth aspect, a terminal device is provided, where the terminal device includes a processor, a display, and a motion sensor, the motion sensor is configured to obtain motion data of the terminal device, and the processor is configured to execute the method in the second aspect or any possible implementation of the second aspect.

Optionally, the terminal device may further include a memory configured to store at least one application program.

BRIEF DESCRIPTION OF DRAWINGS

To describe the technical solutions in the embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 2:
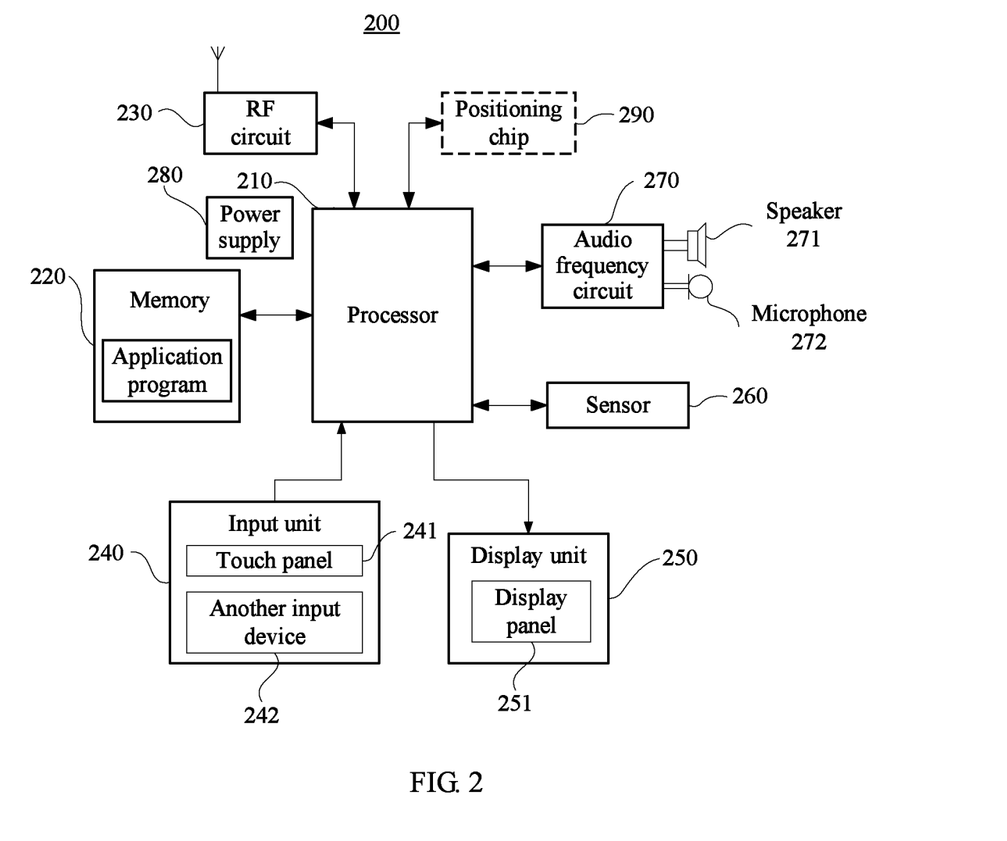
FIG. 2 is a schematic structural diagram of a terminal device according to an embodiment of the present invention.

FIG. 2 schematically shows a terminal device 200 according to an embodiment of the present invention. The terminal device 200 may include a processor 210, a memory 220, and a radio frequency (Radio Frequency, RF) circuit 230. In addition, N application programs may be installed on the terminal device 200, where the N application programs may be stored in the memory 220, and N≥1.

Optionally, the terminal device 200 may further include components such as an input unit 240, a display unit 250, at least one sensor 260, an audio frequency circuit 270, a speaker 271, a microphone 272, and a power supply 280.

Optionally, the terminal device 200 may further include a positioning chip 290, where the positioning chip 290 may be configured to determine a current location of the terminal device. In this embodiment of the present invention, the processor 210 and the positioning chip 290 may be separately disposed or integrated together. This embodiment of the present invention sets no limitation herein. For ease of understanding, the following provides description by using an example in which the terminal device includes the independently disposed positioning chip 290. However, this embodiment of the present invention is not limited herein. The positioning chip 290 may be, for example, a GPS chip.

Specifically, the processor 210 may be a control center of the terminal device 200, connects various components of the terminal device by using various interfaces and lines, and executes various functions of the terminal device 200 by running or executing a program and/or a module stored in the memory 220 and invoking data stored in the memory 220. Optionally, the processor 210 may include one or more processing units.

The memory 220 may be configured to store the software program and the module. The processor 210 runs the software program and the module that are stored in the memory 220 to perform various function applications and data processing of the terminal device 200. The memory 220 may mainly include a program storage area and a data storage area. The program storage area may store an operating system, an application program required by at least one function (such as a sound playback function or an image playback function), and the like. The data storage area may store data (such as audio data, image data, and a phone book) created according to usage of the terminal device 200 and the like. In addition, the memory 220 may include a high-speed random access memory, or may include a nonvolatile memory, for example, at least one disk storage component, a flash memory component, or another volatile solid-state storage component.

The RF circuit 230 may be configured to receive/transmit information, or receive or send a signal in a call process. For example, in a GPS positioning process, the RF circuit 230 may be configured to receive a signal sent by a GPS satellite or another type of positioning system, and transmit the signal to the processor 210 or the positioning chip 290 for processing. Generally, the RF circuit 230 may include but is not limited to an antenna, at least one amplifier, a transceiver, a coupler, a low noise amplifier (Low Noise Amplifier, LNA), a duplexer, and the like. The antenna may include all antennas on a mobile phone, such as a primary antenna and a secondary antenna. The secondary antenna may be a GPS antenna, a Wi-Fi antenna, an NFC antenna, or the like. Multiple types of secondary antennas may share one antenna body. In addition, the RF circuit 230 may further communicate with a network and another device by using a wireless communications technology, for example, may receive downlink information sent by a base station and may further transmit the received downlink information to the processor 210 for processing; or may send uplink data to a base station. Any communications standard or protocol may be used in the wireless communications technology, including but not limited to a Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Messaging Service, SMS), and the like.

The input unit 240 may be configured to receive inputted numerical or character information, and generate a key signal input that is related to a user setting and function control of the terminal device 200. Specifically, the input unit 240 may include a touchscreen 241 and another input device 242. The touchscreen 241 is also referred to as a touch panel, and may be configured to collect a touch operation of a user on or around the touchscreen 241 (such as an operation performed on the touchscreen 241 or around the touchscreen 241 by a user by using any appropriate object or accessory such as a finger or a touch pen), and drive a corresponding connected apparatus according to a preset program. Optionally, the touchscreen 241 may include two parts: a touch detection apparatus and a touch controller. The touch detection apparatus may be configured to detect a touch orientation of the user, detect a signal corresponding to the touch operation, and transmit, to the touch controller, touch information (such as the touch signal and information about the touch orientation) corresponding to the touch operation. The touch controller may be configured to receive the touch information from the touch detection apparatus, convert the touch information into touch point coordinates, and send information about the touch point coordinates to the processor 210. In addition, the touch controller may be further configured to receive a command sent by the processor 210 and execute the command.

Optionally, the touchscreen 241 may be implemented in multiple types such as a resistive type, a capacitive type, an infrared ray, and a surface acoustic wave. In addition to the touchscreen 241, the input unit 240 may further include the another input device 242. Specifically, the another input device 242 may include but is not limited to one or more of a physical keyboard, a function key (such as a volume control key or a power on/off key), a track ball, a mouse, or an operating rod.

The display unit 250 may be configured to display information inputted by a user or information provided for a user and various menus of the terminal device 200. The display unit 250 may include a display panel 251. Optionally, the display panel 241 may be configured in a form of a liquid crystal display (Liquid Crystal Display, LCD), an organic light-emitting diode (Organic Light-Emitting Diode, OLED), or the like. Further, the touchscreen 241 may cover the display panel 251. After detecting the touch operation on or around the touchscreen 241, the touchscreen 241 transmits information about the touch operation to the processor 210 to determine a type of a touch event. The processor 210 may provide a corresponding visual output on the display panel 251 according to the type of the touch event. In FIG. 2, the touchscreen 241 and the display panel 251 serve as two independent components to implement input and output functions of the terminal device 200. However, in some embodiments, the touchscreen 241 and the display panel 251 may be integrated to implement the input and output functions of the terminal device 200.

The at least one sensor 260 may include a motion sensor. The motion sensor may be configured to obtain motion data of the terminal device, and determine accordingly a motion status of the terminal device, where the motion status may include a still state or a moving state. Alternatively, the motion sensor may transmit the obtained motion data to the processor 210, and the processor 210 determines a current motion status of the terminal device according to the motion data.

Optionally, the at least one sensor 260 may further include another sensor, such as an optical sensor or a gravity sensor (gravity sensor). Specifically, the optical sensor may include an optical environment sensor and an optical proximity sensor. The optical environment sensor may adjust luminance of the display panel 241 according to intensity of ambient light. The optical proximity sensor may detect whether an object approaches or is in contact with the terminal device, and disable the display panel 241 and/or backlight when the terminal device 200 moves near an ear. The gravity sensor may be configured to detect a value of an acceleration of the terminal device in various directions (there are generally three axes), may detect a value and a direction of gravity when the terminal device is still, and may be applied to an application (such as landscape/portrait mode switching, a related game, or magnetometer posture calibration) for recognizing a posture of the terminal device, a function (such as a pedometer or a keystroke) related to vibration recognition, and the like. The at least one sensor 260 may further include another sensor such as a gyroscope, a barometer, a hygrometer, a thermometer, or an infrared sensor. Details are not described herein.

Optionally, the audio frequency circuit 270, the speaker 271, and the microphone 272 may provide an audio interface between the user and the terminal device 200. The audio frequency circuit 270 may be configured to convert received audio data into an electrical signal, and transmit the electrical signal to the speaker 271. The speaker 271 may be configured to convert the received electrical signal into an acoustical signal and output the acoustical signal. In another aspect, the microphone 272 may be configured to convert a collected acoustical signal into an electrical signal and transmit the electrical signal to the audio frequency circuit. The audio frequency circuit 270 may convert the received electrical signal into audio data, and output the audio data to the RF circuit 230, so as to send the audio data to another device, or output the audio data to the memory 220 for further processing.

Optionally, the terminal device 200 may further include the power supply 280 (such as a battery) that provides power supply for all components. Preferably, the power supply may be logically connected to the processor 210 by using a power supply management system, so as to implement, by using the power supply management system, functions such as charging and discharging management and power consumption management.

It should be understood that, the terminal device 200 may further include a Wireless Fidelity (Wireless Fidelity, WiFi) module, a Bluetooth module, and the like, although they are not shown. Details are not described herein.

It should be further understood that, for ease of description, FIG. 2 shows merely a part related to this embodiment of the present invention. For specific technical details that are not disclosed, refer to specific descriptions in the embodiments of the present invention.

It should be further understood that, a terminal device structure shown in FIG. 2 is merely an example. The terminal device in this embodiment of the present invention may include more or less components than those shown in FIG. 2, or may combine some components, or may have a component layout different from that in FIG. 2. The terminal device structure shown in FIG. 2 does not set a limitation on this embodiment of the present invention.

In this embodiment of the present invention, the positioning chip may provide a positioning service for an application program 220 by using the processor 210. For example, the application program 220 may send a positioning request to the processor 210; the processor 210 may forward the positioning request to the positioning chip; and after receiving the positioning request, the positioning chip may send current positioning data of the terminal device 200 to the application program 220 by using the processor 210. Optionally, after receiving a positioning request sent by an application program, the positioning chip may provide positioning data for the application program only once; or may periodically send, in a period of time, positioning data to the application program; or may send, in a period of time, positioning data to the application program each time the positioning chip obtains the positioning data. A length of the period of time may be preset, or may be determined according to the positioning request sent by the application program. Alternatively, the period of time may last until the positioning chip receives a positioning stop request sent by the application program. However, this embodiment of the present invention is not limited herein. Optionally, the positioning data may include at least one of the following data: location (location) data, geo-fencing (Geo-fencing) data, National Marine Electronics Association (National Marine Electronics Association, NMEA) GPS data, satellite status related data, GPS navigation data, or GPS measurement status data, or include another type of positioning data. This embodiment of the present invention sets no limitation herein.

Optionally, the processor 210 may be configured to determine, according to a current status of the application program, whether to provide the positioning service for the application program. Specifically, the processor 210 may be configured to receive positioning information, where the positioning information may include the positioning request sent by the application program or the positioning data sent by the positioning chip. The processor 210 may determine, according to the current status of the application program, whether to send the positioning information corresponding to the application program, where the positioning information corresponding to the application program may include the positioning request sent by the application program or the positioning data requested by the application program. Optionally, the current status of the application program may include at least one of a positioning service authorization status or a running status, where the running status may include foreground running, background running, or not running, and the positioning service authorization status may include being in a positioning service restricted state or not being in a positioning service restricted state. Optionally, the not being in a positioning service restricted state may also be referred to as being in a positioning service non-restricted state. An application program in a positioning service non-restricted state is allowed to use a positioning service in any case. For example, all positioning service requests of the application program in the positioning service non-restricted state are allowed and fulfilled. However, an application program in a positioning service restricted state is allowed to use a positioning service in some conditions (for example, running at the foreground) and is prohibited from using the positioning service in other conditions. A condition in which the application program is allowed to use or is prohibited from using the positioning service may be preset. For example, the condition is set by a user of the terminal device, or is set by a vendor of the terminal device. This embodiment of the present invention sets no limitation herein.

Optionally, if the application program is currently in the positioning service non-restricted state or the application program is currently running at the foreground, the processor 210 may send the positioning information corresponding to the application program.

Optionally, if the application program is currently in the positioning service restricted state and running in the background, the processor may not send the positioning information corresponding to the application program.

For example, the processor 210 may be configured to receive a positioning request sent by a first application program, and determine, according to a current status of the first application program, whether to forward the positioning request to the positioning chip. Optionally, if the processor 210 determines that the first application program is in a positioning service non-restricted state or determines that the first application program is running at the foreground, the processor 210 may forward the positioning request to the positioning chip. Optionally, in another embodiment, if the processor 210 determines that the first application program is currently in a positioning service restricted state and the first application program is running in the background, the processor 210 may discard the positioning request and not forward the positioning request to the positioning chip.

For another example, the processor 210 may be configured to receive positioning data sent by the positioning chip, and determine, according to a current status of each application program in at least one application program that requests a positioning service, whether to send the positioning data to each application program. The processor 210 may determine, according to at least one positioning request that is received, the at least one application program that requests the positioning service; or may obtain a positioning service request application list, and determine all application programs in the positioning service request application list as the at least one application program that requests the positioning service. The positioning service request application list may be generated by the processor 210 according to the received positioning request, or may be generated by another component. This embodiment of the present invention sets no limitation herein.

In this case, optionally, if the processor 210 determines that a first application program in the at least one application program is in a positioning service non-restricted state or determines that the first application program is running at the foreground, the processor 210 may send the positioning data to the first application program. Optionally, in another embodiment, if the processor 210 determines that a first application program in the at least one application program is currently in a positioning service restricted state and running at the background, the processor 210 may not send the positioning data to the first application program. In this case, optionally, the processor 210 may send the positioning data to an application program that is in the at least one application program and that is in a positioning service non-restricted state and an application program that is in the at least one application program and that is running at the foreground. However, this embodiment of the present invention is not limited herein. When the processor 210 does not send the positioning data to the first application program, the first application program may not run the positioning service, so as to reduce power consumption generated when the first application program runs.

Therefore, according to the terminal device in this embodiment of the present invention, when the first application program is in the positioning service restricted state and the first application program is currently running in the background, the processor provides no positioning service for the first application program. This can implement active control on power consumption caused by the positioning service in the terminal device, and avoid an abnormal positioning behavior, such as frequent positioning initiation or long-time positioning, of some application programs that are running in the background of the terminal device, so as to reduce power consumption of the terminal device, increase a standby time of the terminal device, and improve user experience.

In this embodiment of the present invention, a positioning service authorization status may be set for all or some application programs installed on the terminal device 200. For example, a positioning service authorization status of an application program that may have or often has an abnormal positioning behavior may be set to a positioning service restricted state. Optionally, a positioning service authorization status of each application program may be set by a user, or may be a default setting of the terminal device, or may be determined by the terminal device by analyzing and collecting statistics on a behavior of the application program. This embodiment of the present invention is not limited herein. Alternatively, some application programs may be set to a positioning service restricted state, and other applications programs that are not set to a positioning service restricted state are in a positioning service non-restricted state by default, or are not in a positioning service restricted state by default. This embodiment of the present invention sets no limitation herein.

In an optional embodiment, the processor 210 may separately determine a positioning service authorization status and a running status of an application program.

Specifically, the processor 210 may determine, in multiple manners, whether the application program is in a positioning service restricted state. For example, the terminal device 200 further includes the memory. The memory may store a positioning service blacklist. The positioning service blacklist includes at least one application program that is set to a positioning service restricted state. In this case, the processor 210 may determine, by querying whether the positioning service blacklist includes a first application program, whether the first application program is in a positioning service restricted state. Alternatively, the terminal device 200 may set a tag for the application program to indicate the positioning service authorization status of the application program. The terminal device 200 may set tags for all application programs, where the tags indicate that the application programs are in a positioning service restricted state or a positioning service non-restricted state. Alternatively, the terminal device 200 may set a tag only for an application program that is set to a positioning service restricted state, that is, an application program for which a tag is set is an application program in a positioning service restricted state, and an application program for which no tag is set is an application program in a positioning service non-restricted state. In this case, the processor may determine whether the first application program is in the positioning service restricted state according to a tag of the first application program or according to whether a tag is set for the first application program. Optionally, the processor may also determine the positioning service authorization status of the application program in another manner. This embodiment of the present invention sets no limitation herein.

Optionally, if the processor 210 determines that the first application program is currently running at the foreground, the processor 210 may not perform a step of determining a positioning service authorization status of the first application program or determining whether the first application program is in the positioning service restricted state. Instead, the processor 210 directly sends positioning information corresponding to the first application program. Alternatively, if the processor 210 determines that the first application program is not in the positioning service restricted state, the processor 210 may not perform a step of determining a running status of the first application program. Instead, the processor 210 directly sends positioning information corresponding to the first application program. However, this embodiment of the present invention is not limited herein.

In another optional embodiment, the processor 210 may not separately determine a positioning service authorization status and a running status of an application program. Instead, the processor 210 directly determines that a current status of the application program is allowed to use a positioning service or prohibited from using a positioning service. An application program prohibited from using a positioning service is an application program that is in a positioning service restricted state and that is running in the background. An application program allowed to use a positioning service is an application program that is not in a positioning service restricted state or an application program that is running at the foreground. Optionally, the memory of the terminal device 200 may store a positioning service frozen application list. The positioning service frozen application list includes at least one application program that is prohibited from using a positioning function. In this case, the processor 210 may directly determine a current status of a first application program by querying the positioning service frozen application list. Specifically, if the positioning service frozen application list includes the first application program, the processor may determine that the current status of the first application program is prohibited from using a positioning function, that is, the first application program is currently in a positioning service restricted state and running in the background. Otherwise, if the positioning service frozen application list does not include the first application program, the processor 210 may determine that the current status of the first application program is allowed to use a positioning function, that is, the first application program is not in a positioning service restricted state, or the first application program is running at the foreground. However, this embodiment of the present invention is not limited herein.

Optionally, the positioning service frozen application list may be generated by the processor 210. For example, the processor may add, to the positioning service frozen application list, at least one application program that is in a positioning service restricted state and that is running in the background. However, this embodiment of the present invention is not limited herein.

Optionally, the processor 210 may be further configured to update the positioning service frozen application list. Specifically, the processor 210 may periodically or be triggered to update the positioning service frozen application list. For example, if an application program in the positioning service frozen list changes from background running to foreground running, the processor 210 may delete the application program from the positioning service frozen application list. Alternatively, if an application program in a positioning service restricted state changes from foreground running to background running, the processor 210 may add the application program to the positioning service frozen application list. Alternatively, if a setting of a user or the terminal device changes, and consequently, an application program in a positioning service restricted state changes to not being in the positioning service restricted state, and the application program is included in the positioning service frozen application list, the processor 210 may also delete the application program from the positioning service frozen application list. However, this embodiment of the present invention is not limited herein.

In another optional embodiment, the processor 210 in the terminal device 200 may be configured to determine, according to a current status of the terminal device 200, whether to provide a positioning service for at least one application program that requests the positioning service. For example, the processor 210 may determine, according to the current status of the terminal device, whether to send obtained positioning information. Optionally, the current status of the terminal device 200 may be determined according to at least one of a status of a display, a motion status, or the like. For example, the terminal device 200 may further include the display and the motion sensor that is configured to obtain current motion data of the terminal device. In this case, the processor 210 may determine, according to the status of the display and the motion status of the terminal device that is determined according to the motion data, whether to send the obtained positioning information. The motion status may include a moving state or a still state, and the motion status may be determined by the motion sensor or the processor according to the motion data. This embodiment of the present invention sets no limitation herein.

If the processor 210 determines that the terminal device 200 currently meets any one of the following conditions: the display is in a screen-off state, the motion status is the still state, or the display is in a screen-off state and the motion status is the still state, the processor 210 may discard the positioning information, that is, the processor does not provide the positioning service for the at least one application program that requests the positioning service. Optionally, if the processor 210 receives a positioning request sent by any application program in the at least one application program, the processor 210 may discard the positioning request and not forward the positioning request to the positioning chip. Alternatively, if the processor 210 receives positioning data sent by the positioning chip, the processor 210 may discard the positioning data and not send the positioning data to any application program in the at least one application program. However, this embodiment of the present invention sets no limitation herein.

Optionally, to further reduce power consumption of the terminal device, the processor may further disable the positioning service, for example, disable the positioning chip. However, this embodiment of the present invention is not limited herein.

Optionally, the processor 210 may discard the positioning information when determining that the terminal device is currently in the still state and/or the display is in the screen-off state; or may discard the positioning information when determining that the terminal device is in the still state for specific duration and/or the display is in the screen-off state for specific duration. For example, the processor 210 discards the positioning information if the terminal device currently meets any one of the following conditions: the duration in which the display is in the screen-off state reaches a first threshold, the duration in which the terminal device is in the still state reaches a second threshold, or the duration in which the display is in the screen-off state reaches a third threshold and the terminal device is currently in the still state. However, this embodiment of the present invention is not limited herein.

Correspondingly, the processor 210 may send the positioning information if the processor 210 determines that the terminal device 200 does not meet the foregoing conditions.

In another optional embodiment, if the processor 210 determines that the display of the terminal device 200 is in a screen-on state and/or the terminal device 200 is currently in the moving state, the processor 210 may send the positioning information, that is, the processor provides the positioning service for the at least one application program that requests the positioning service. Optionally, if the processor 210 receives a positioning request sent by one or more application programs in the at least one application program, the processor 210 may forward the received positioning request to the positioning chip. Alternatively, if the processor 210 receives positioning data sent by the positioning chip, the processor 210 may send the positioning data to one or more application programs in the at least one application program. However, this embodiment of the present invention sets no limitation herein. Optionally, the processor 210 may further determine, according to a current status of each application program in the at least one application program, whether to provide a positioning service for each application program. For a specific implementation, refer to the descriptions of the first application program in the foregoing embodiments. For clarity, details are not described herein.

In another optional embodiment, the processor 210 may be further configured to discard the positioning information when determining that the terminal device is in a user sleep state. However, this embodiment of the present invention is not limited herein.

In this embodiment of the present invention, the terminal device 200 may be any device with a positioning function, for example, a mobile phone, a tablet personal computer (Tablet Personal Computer), a media player, a smart television, a laptop computer (Laptop Computer), an ultra-mobile personal computer (Ultra-mobile Personal Computer, UMPC), a netbook, a personal digital assistant (personal digital assistant, PDA), a personal computer (Personal Computer), a mobile Internet device (Mobile Internet Device, MID), or a wearable device (Wearable Device) such as a smart watch. This embodiment of the present invention sets no limitation herein.

Optionally, the processor 210 may include an integrated circuit (Integrated Circuit, IC). For example, the processor 210 may include an independently packaged IC, or may include multiple packaged ICs that have a same function or different functions and that are connected. The processor 210 may be a central processing unit (Central Processing Unit, CPU). The processor 210 may also be another general-purpose processor, a digital signal processor (DSP), an application-specific integrated circuit (ASIC), a field programmable gate array (FPGA) or another programmable logical device, a discrete gate or transistor logical device, a discrete hardware component, or the like. The general-purpose processor may be a microprocessor, or the processor may also be any conventional processor or the like. This embodiment of the present invention sets no limitation herein.

Optionally, the processor 210 may be coupled with the memory 220 and configured to execute an instruction stored in the memory 220. When the processor 210 executes the instruction, the processor is configured to perform steps corresponding to the processor in the foregoing embodiments. However, this embodiment of the present invention is not limited herein.

Figure 3:
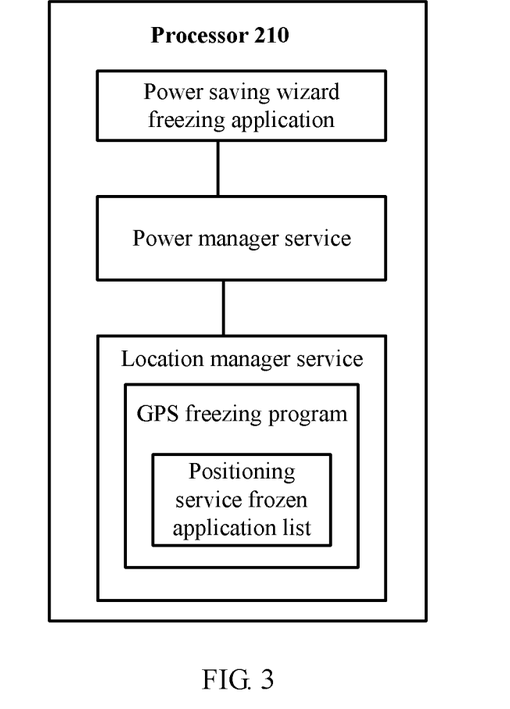
FIG. 3 is a schematic block diagram of a specific implementation of a processor in a terminal device according to an embodiment of the present invention.

FIG. 3 shows a possible implementation of the processor 210 in this embodiment of the present invention. The processor 210 may include a power saving wizard freezing application, a power manager service (Power Manager Service), and a location manager service (Location Manager Service). The power saving wizard freezing application is used to generate the positioning service frozen application list, for example, determine, according to a current application scenario, at least one application program that is prohibited from using a positioning service, and send the power saving wizard frozen application list to the location manager service by using the power manager service. The power manager service may be connected to the location manager service by using a proxy GPS (proxyGPS) interface. The location manager service includes a GPS freezing program (GpsFreezeProc), and the GPS freezing program includes the positioning service frozen application list (such as HashMap). The location manager service may determine, by querying the positioning service frozen application list, whether to send positioning data to an application program or whether to send a positioning request of an application program to the positioning chip.

In another optional embodiment, to further reduce power consumption of the terminal device, the processor 210 may be further configured to stop executing an instruction of the first application program when determining that the first application program is in a positioning service restricted state and running in the background, so that the first application program enters a frozen state. However, this embodiment of the present invention is not limited herein.

Optionally, in this embodiment of the present invention, a condition in which an application program enters a frozen state or changes from a frozen state to an active state may be similar to a condition of whether an application program is allowed to use a positioning service. For clarity, details are not described herein.

Figure 4:
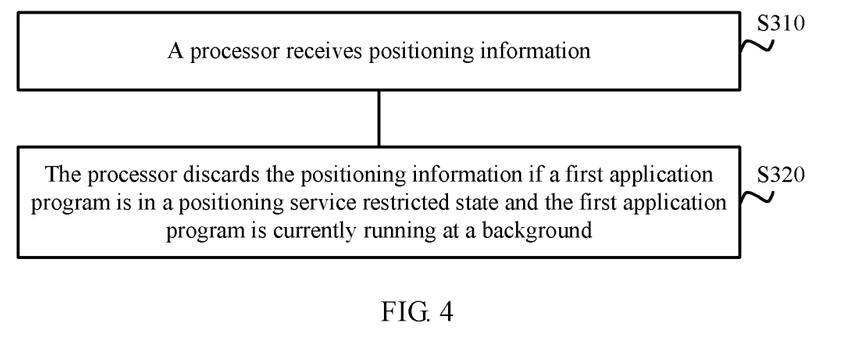
FIG. 4 is a schematic flowchart of a positioning information processing method applied to a terminal device according to an embodiment of the present invention.
Figure 5:
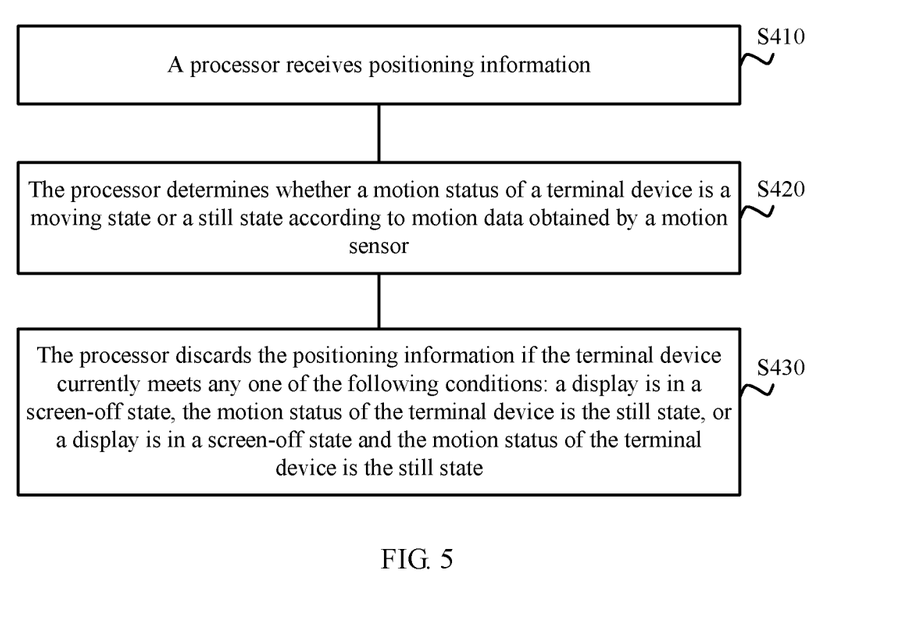
FIG. 5 is a schematic flowchart of a positioning information processing method applied to a terminal device according to another embodiment of the present invention.
Figure 6:
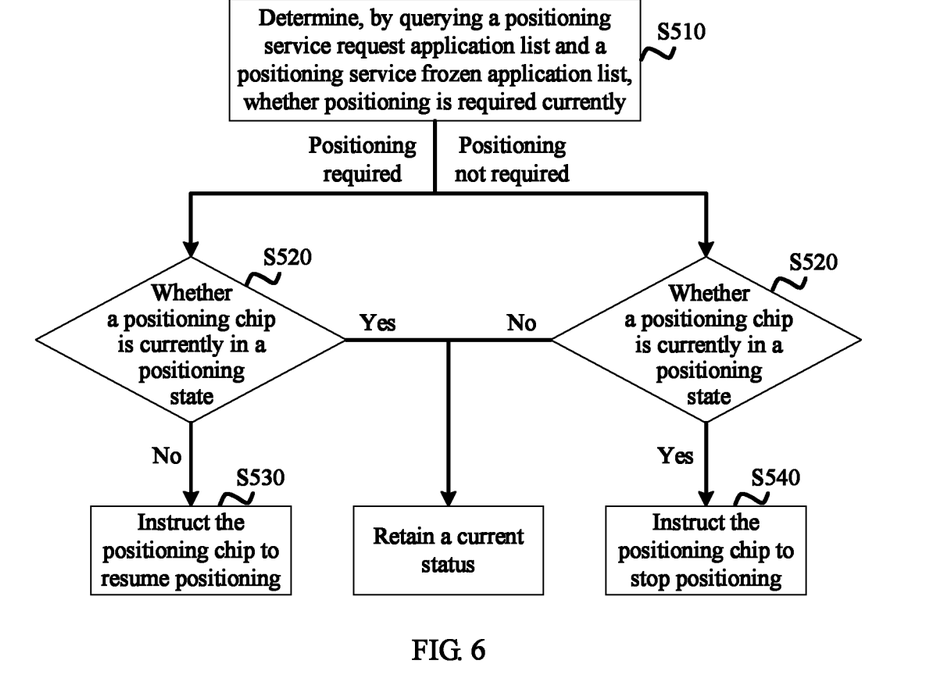
FIG. 6 is a schematic flowchart of an example of a positioning information processing method applied to a terminal device according to another embodiment of the present invention.

With reference to FIG. 2 and FIG. 3, the foregoing describes the terminal device according to this embodiment of the present invention in detail. With reference to FIG. 4 to FIG. 6, the following describes in detail a positioning information processing method according to an embodiment of the present invention.

FIG. 4 shows a positioning information processing method 300 provided in an embodiment of the present invention. The positioning information processing method may be applied to a terminal device with a positioning function, for example, applied to the foregoing terminal device 200. The terminal device includes a memory configured to store at least one application program and a processor. As shown in FIG. 4, the method 300 includes the following steps.

S310. A processor receives positioning information.

S320. The processor discards the positioning information if a first application program is in a positioning service restricted state and the first application program is currently running in the background.

In this embodiment of the present invention, the at least one application program includes the first application program and the first application program requests a positioning service (including that the application program has requested the positioning service or is requesting the positioning service). If the first application program is in the positioning service restricted state and the first application program is currently running in the background, the processor discards the positioning information corresponding to the first application program. The positioning information corresponding to the first application program may include at least one of the following: positioning data requested by the first application program, or a positioning request of the first application program. However, this embodiment of the present invention is not limited herein.

Optionally, the terminal device further includes a positioning chip configured to obtain positioning data outside the terminal device.

In this case, in an optional embodiment, the receiving, by a processor, positioning information in S310 includes: receiving, by the processor, the positioning request sent by the first application program; and the discarding, by the processor, the positioning information in S320 includes: skipping, by the processor, sending the positioning request to the positioning chip.

In this case, in another optional embodiment, the receiving, by a processor, positioning information in S310 includes: receiving, by the processor, current positioning data of the terminal device that is sent by the positioning chip; and the discarding, by the processor, the positioning information in S320 includes: prohibiting, by the processor, sending the current positioning data of the terminal device to the first application program.

In this case, the processor does not send the positioning data to the first application program. Optionally, the processor may send the positioning data to another application program that requests the positioning service. However, this embodiment of the present invention is not limited herein.

Optionally, the terminal device may not include the positioning chip. For example, the processor is integrated with a positioning function. In this case, optionally, the processor may receive positioning data sent by an RF circuit. Alternatively, the processor may receive a positioning signal sent by an RF circuit, and generate positioning data according to the positioning signal. In addition, the processor may further determine, according to a current status of the first application program, whether to send the positioning data to the first application program.

In another optional embodiment, the method 300 further includes: sending, by the processor, the positioning information if the first application program is not in a positioning service restricted state and/or the first application program is currently running at the foreground.

Optionally, if the terminal device does not include the positioning chip, when receiving the positioning request of the first application program, the processor may determine, according to the current status of the first application program, whether to approve the positioning request. For example, if the first application program is in the positioning service restricted state and the first application program is currently running in the background, the processor may discard the received positioning request message, so as to reject the positioning request of the first application program; otherwise, the processor may approve the positioning request of the first application program, for example, may send a positioning request response to the first application program, or may directly send the current positioning data to the first application program. However, this embodiment of the present invention is not limited herein.

In this case, optionally, if the positioning information includes the positioning request of the first application program, the sending, by the processor, the positioning information includes: sending, by the processor, the positioning request to the positioning chip.

In this case, optionally, if the positioning information includes the positioning data, the sending, by the processor, the positioning information includes: sending, by the processor, the positioning data to the first application program.

In an optional embodiment, whether the first application program is in the positioning service restricted state is preset by a user or is a default setting of the terminal device. Alternatively, whether the first application program is in the positioning service restricted state may be determined by the terminal device by collecting statistics on a behavior of the first application program. However, this embodiment of the present invention is not limited herein.

In another optional embodiment, before S320, the method 300 further includes:

determining, by the processor, whether a positioning service frozen application list includes the first application program, where the positioning service frozen application list includes at least one application program that is in a positioning service restricted state and that is running in the background; and correspondingly, the discarding, by the processor, the positioning information if the first application program is in a positioning service restricted state and the first application program is currently running in the background in S320 includes:

discarding, by the processor, the positioning information if the positioning service frozen application list includes the first application program.

In this case, the processor may determine, by querying the positioning service frozen application list, whether the first application program is in the positioning service restricted state and running in the background.

In another optional embodiment, optionally, the sending, by the processor, the positioning information if the first application program is not in a positioning service restricted state and/or the first application program is currently running at the foreground includes:

sending, by the processor, the positioning information if the positioning service frozen list does not include the first application program.

In another optional embodiment, the method 300 further includes:

deleting, by the processor, the first application program from the positioning service frozen application list if the first application program changes from background running to foreground running.

In another optional embodiment, the method 300 further includes: adding, by the processor, a second application program to the positioning service frozen application list if the second application program in the at least one application program changes from foreground running to background running and the second application program is in a positioning service restricted state.

For steps and specific implementations of the method 300 in this embodiment of the present invention, refer to corresponding descriptions in the foregoing apparatus embodiments. To avoid repetition, details are not described herein.

Therefore, according to the positioning information processing method in this embodiment of the present invention, the processor discards the positioning information corresponding to the first application program when the first application program is in the positioning service restricted state and the first application program is currently running in the background. This can avoid an abnormal positioning behavior, such as frequent positioning initiation or long-time positioning, of some application programs that are running in the background of the terminal device, so as to reduce power consumption of the terminal device, increase a standby time of the terminal device, and improve user experience.

FIG. 5 shows a positioning information processing method 400 provided in another embodiment of the present invention. The positioning information processing method may be applied to a terminal device with a positioning function, for example, applied to the foregoing terminal device 200. The terminal device includes a processor, a display, and a motion sensor. As shown in FIG. 5, the method 400 includes the following steps.

S410. A processor receives positioning information.

S420. The processor determines whether a motion status of a terminal device is a moving state or a still state according to motion data obtained by a motion sensor.

S430. The processor discards the positioning information if the terminal device currently meets any one of the following conditions: a display is in a screen-off state, the motion status of the terminal device is the still state, or a display is in a screen-off state and the motion status of the terminal device is the still state.

Optionally, if a current motion status of the terminal device is the still state and/or the display of the terminal device is currently in the screen-off state, the processor may discard the positioning information, for example, provide no positioning service for one or more application programs on the terminal device.

In an optional embodiment, the discarding, by the processor, the positioning information if the terminal device currently meets any one of the following conditions: a display is in a screen-off state, the motion status of the terminal device is the still state, or a display is in a screen-off state and the motion status of the terminal device is the still state in S430 includes:

discarding, by the processor, the positioning information if the terminal device currently meets any one of the following conditions: duration in which the display is in the screen-off state reaches a first threshold, duration in which the terminal device is in the still state reaches a second threshold, or duration in which the display is in the screen-off state reaches a third threshold and the current motion status of the terminal device is the still state.

The first threshold, the second threshold, or the third threshold may be predefined, or may be set by a user. This embodiment of the present invention sets no limitation herein.

In another optional embodiment, the method 400 further includes: sending, by the processor, the positioning information if a current motion status of the terminal device is the moving state and/or the display of the terminal device is currently in a screen-on state.

Optionally, the sending, by the processor, the positioning information if a current motion status of the terminal device is the moving state and/or the display of the terminal device is currently in a screen-on state includes: if the current motion status of the terminal device is the moving state and/or the display of the terminal device is currently in the screen-on state, determining, by the processor according to a current status of a first application program, whether to send the positioning information.

Optionally, the terminal device further includes a positioning chip configured to obtain current positioning data of the terminal device.

In an optional embodiment, the receiving, by a processor, positioning information in S410 includes: receiving, by the processor, a positioning request sent by the first application program; and the discarding, by the processor, the positioning information in S430 includes: prohibiting, by the processor, sending the positioning request to the positioning chip, where in this case, the processor does not send the positioning request to the positioning chip.

Optionally, if the positioning information includes the positioning request of the first application program, the sending, by the processor, the positioning information includes: sending, by the processor, the positioning request of the first application program to the positioning chip.

In another optional embodiment, the receiving, by a processor, positioning information in S410 includes: receiving, by the processor, current positioning data of the terminal device that is sent by the positioning chip; and the discarding, by the processor, the positioning information in S430 includes: prohibiting, by the processor, sending the current positioning data of the terminal device to the first application program, where in this case, the processor does not send the current positioning data of the terminal device to one or more application programs on the terminal device that request a positioning service.

Optionally, if the positioning information includes the positioning data, the sending, by the processor, the positioning information includes: sending, by the processor, the positioning data to the first application program.

For steps and specific implementations of the method 400 in this embodiment of the present invention, refer to corresponding descriptions in the foregoing apparatus embodiments. To avoid repetition, details are not described herein.

Therefore, according to the positioning information processing method in this embodiment of the present invention, when determining that the display of the terminal device is currently in the screen-off state and/or the terminal device is currently in the still state, the processor discards the received positioning information. This can implement active control on power consumption caused by the positioning service in the terminal device, reduce power consumption of the terminal device, increase a standby time of the terminal device, and improve user experience.

With reference to a specific example, the following provides more detailed description of a positioning information processing method provided in an embodiment of the present invention. FIG. 6 shows a positioning information processing method 500 provided in another embodiment of the present invention.

S510. Determine, by querying a positioning service request application list and a positioning service frozen application list, whether positioning is required currently.

The positioning service request application list includes at least one application program that requests a positioning service. The positioning service frozen application list includes at least one application program that is prohibited from using the positioning service. The processor may determine, by querying the positioning service request application list, whether there is currently at least one application program that requests the positioning service. If the positioning service request application list includes one or more application programs, the processor may determine, by querying the positioning service frozen application list, whether the application program in the positioning service request application list is prohibited from using the positioning service, and further determine whether an application program that is allowed to use the positioning service exists in the positioning service request application list. If an application program that is allowed to use the positioning service exists in the positioning service request application list, the processor may determine that positioning needs to be performed currently; otherwise, the processor may determine that positioning does not need to be performed currently.

Optionally, the processor may periodically perform S510, or may be triggered to perform S510. For example, the processor performs S510 when the positioning service request application list and/or the positioning service frozen application list changes. However, this embodiment of the present invention is not limited herein.

S520. Determine whether a positioning chip is currently in a positioning state.

Optionally, a current status may be retained if the positioning chip is currently in the positioning state and the processor determines that positioning needs to be performed currently, or if the positioning chip is currently not in the positioning state and the processor determines that positioning does not need to be performed currently. The method proceeds to S530 if the positioning chip is currently not in the positioning state and the processor determines that positioning needs to be performed currently. The method proceeds to S540 if the positioning chip is currently in the positioning state and the processor determines that positioning does not need to be performed currently.

S530. Send first instruction information to the positioning chip, where the first instruction information is used to instruct the positioning chip to perform positioning.

S540. Send second instruction information to the positioning chip, where the second instruction information is used to instruct the positioning chip to stop positioning.

The processor sends an instruction to the positioning chip, to instruct the positioning chip to resume positioning or stop positioning.

It should be noted that, the example in FIG. 6 is to help a person skilled in the art better understand the embodiments of the present invention instead of limiting the scope of the embodiments of the present invention. A person skilled in the art may perform various equivalent modifications or variations according to the example shown in FIG. 6, and such modifications or variations also fall within the scope of the embodiments of the present invention.

It should be understood that, sequence numbers of the foregoing processes do not mean execution sequences. The execution sequences of the processes should be determined according to functions and internal logic of the processes, and should not be construed as any limitation on the implementation processes of the embodiments of the present invention.

An embodiment of the present invention further provides a computer readable medium, configured to store a computer program. The computer program includes an instruction used to execute the foregoing method.

It should be understood that, for clarity, descriptions of the embodiments in this specification emphasize differences between the embodiments. Therefore, mutual reference may be made to the embodiments in this specification unless otherwise explicitly specified in this specification or easily figured out from context.

A person of ordinary skill in the art may be aware that, in combination with the examples described in the embodiments disclosed in this specification, method steps and units may be implemented by electronic hardware, computer software, or a combination thereof. To clearly describe interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal device, comprising:
a positioning chip configured to obtain positioning data of the terminal device; and
a processor coupled to the positioning chip and configured to:
receive a positioning request from a first application program included in the terminal device;
obtain using state and running state of the first application program by querying a positioning service frozen application list;
determine whether the positioning service frozen application list includes the first application program, wherein the positioning service frozen application list includes the first application program that is in a position service restricted state and is running in a background;
discard the positioning request and prevent sending the positioning request to the positioning chip when the first application program is included in the positioning service frozen application list; and
send the positioning request to the positioning chip when the first application program is not included in the positioning service frozen application list or the first application program is running in a foreground.

2. The terminal device of claim 1, wherein whether the first application program is in the positioning service restricted state is set by a user.

3. The terminal device of claim 1, wherein whether the first application program is in the positioning service restricted state is a default setting of the terminal device.

4. The terminal device of claim 1, wherein the processor is further configured to delete the first application program from the positioning service frozen list when the first application program changes from background running to foreground running.

5. The terminal device of claim 1, wherein the positioning service frozen list is stored in the terminal device.

6. The terminal device of claim 1, wherein the running state comprises foreground running state, background running state, or not running state.

7. The terminal device of claim 1, wherein discard the positioning request when the first application program is included in the positioning service frozen application list comprises: discard the positioning request when the application program is in the positioning service restricted state and the first application program is running in the background.

8. The terminal device of claim 1, further comprising periodically update the positioning service frozen application list.

9. The terminal device of claim 1, further comprising:
add the first application program to the positioning service frozen application list when the first application program in the positioning service restricted state changes from foreground running to background running.

10. The terminal device of claim 1, wherein whether the first application program is in the positioning service restricted state is set by collecting statistics on a behavior of the first application program.

11. A terminal device, comprising:
a positioning chip configured to obtain positioning data of the terminal device; and
a processor coupled to the positioning chip and configured to:
receive current positioning data of the terminal device from the positioning chip;
obtain using state and running state of a first application program included in the terminal device by querying a positioning service frozen application list;
determine whether the positioning service frozen application list includes the first application program, wherein the positioning service frozen application list includes the first application program that is in a position service restricted state and running in a background;
prevent sending the current positioning data to the first application program when the first application program is included in the positioning service frozen application list; and
send the current positioning data to the first application program when the first application program is not included in the positioning service frozen application list or the first application program is running in a foreground.

12. The terminal device of claim 11, wherein whether the first application program is in the positioning service restricted state is set by a user.

13. The terminal device of claim 11, wherein whether the first application program is in the positioning service restricted state is a default setting of the terminal device.

14. The terminal device of claim 11, wherein the processor is further configured to delete the first application program from the positioning service frozen list when the first application program changes from background running to foreground running.

15. The terminal device of claim 11, wherein the positioning service frozen list is stored in the terminal device.

16. The terminal device of claim 11, wherein the running state comprises foreground running state, background running state, or not running state.

17. The terminal device of claim 11, wherein discard the positioning request when the first application program is included in the positioning service frozen application list comprises: discard the positioning request when the application program is in the positioning service restricted state and the first application program is running in the background.

18. The terminal device of claim 11, further comprising periodically update the positioning service frozen application list.

19. The terminal device of claim 11, further comprising:
add the first application program to the positioning service frozen application list when the first application program in the positioning service restricted state changes from foreground running to background running.

20. The terminal device of claim 11, wherein whether the first application program is in the positioning service restricted state is set by collecting statistics on a behavior of the first application program.

* * * * *